Dec. 17, 1946.  L. S. WILLIAMS  2,412,761
REDUCTION CAMERA
Filed April 3, 1942  4 Sheets-Sheet 2
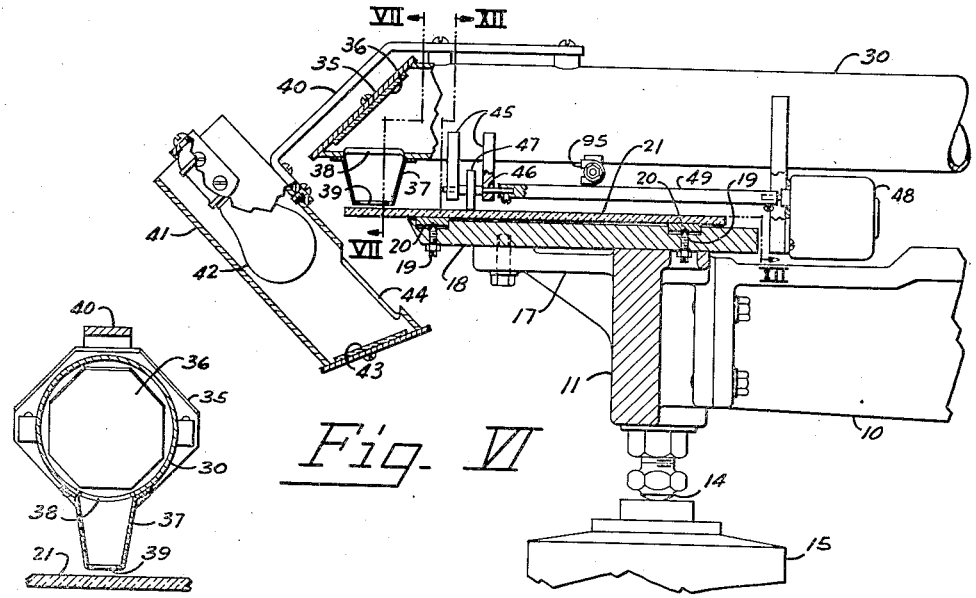
Fig. VI
Fig. VII
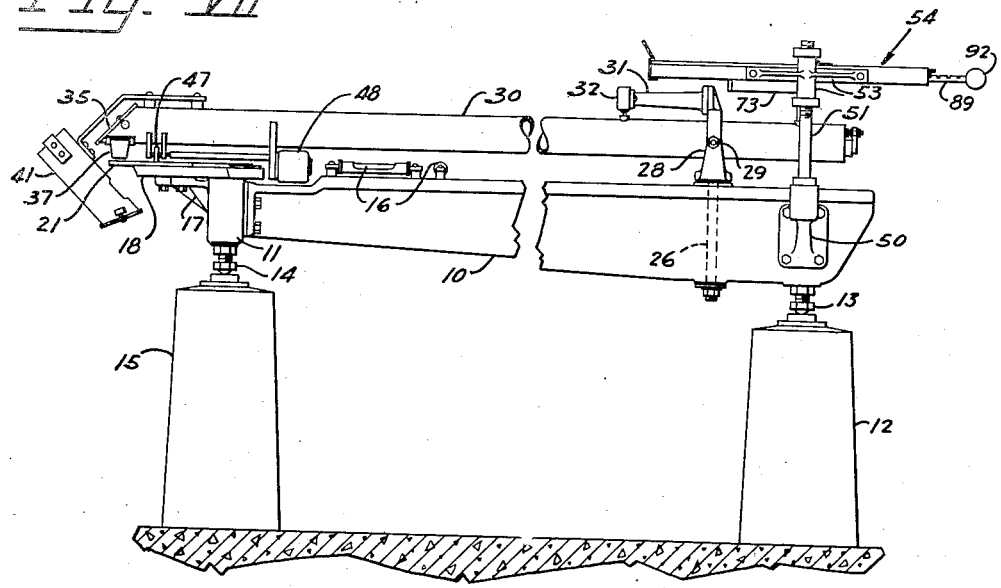
Fig. V
Lawrence S. Williams
INVENTOR
BY Marshall & Marshall
ATTORNEYS Dec. 17, 1946.					L. S. WILLIAMS					2,412,761
REDUCTION CAMERA
Filed April 3, 1942					4 Sheets-Sheet 3
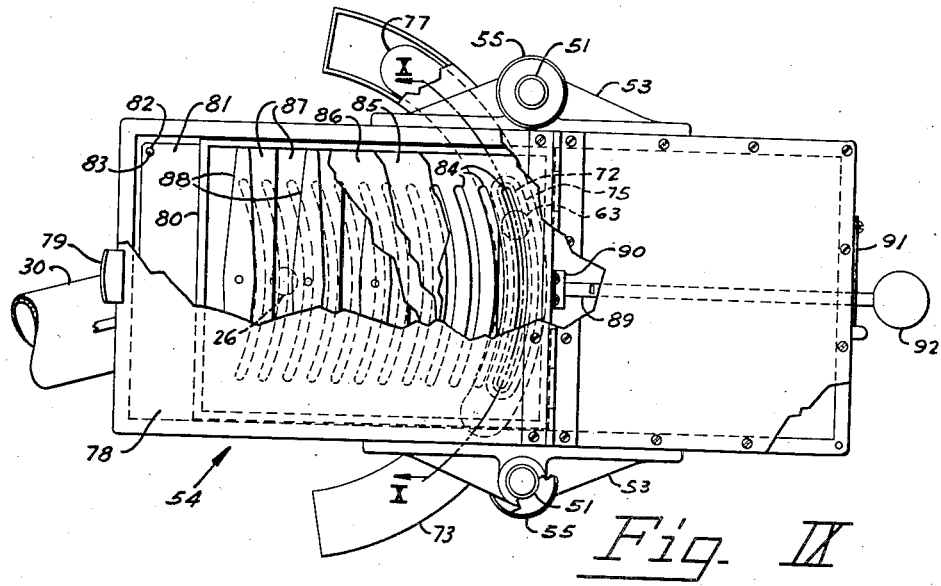
Fig. IX
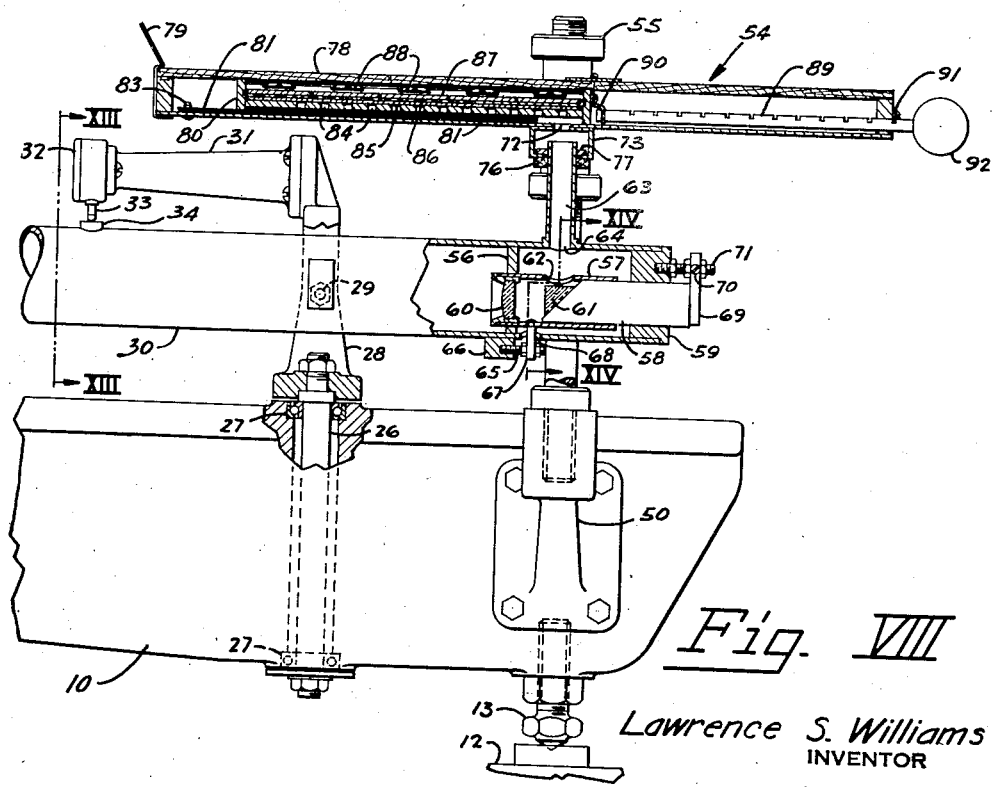
Fig. VIII
Lawrence S. Williams
INVENTOR
BY Marshall & Marshall
ATTORNEYS Dec. 17, 1946.  L. S. WILLIAMS  2,412,761
REDUCTION CAMERA
Filed April 3, 1942
4 Sheets-Sheet 4
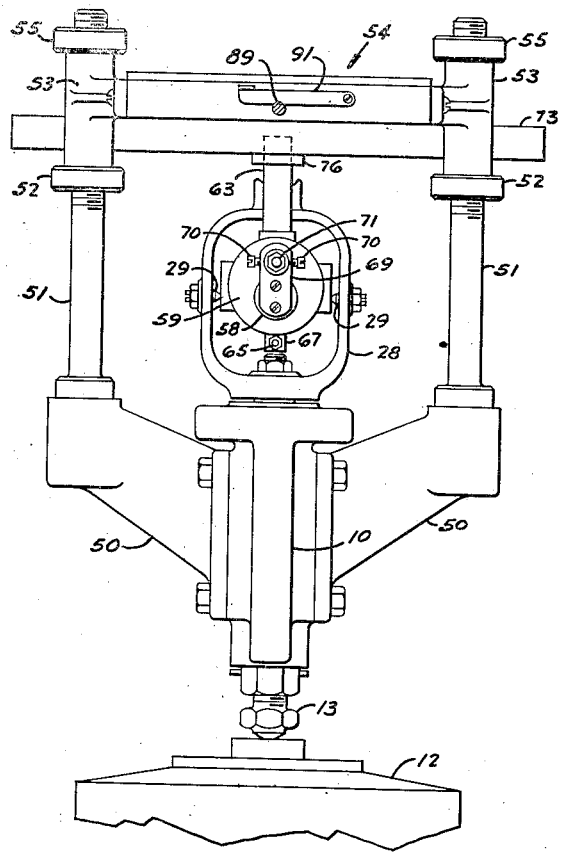
Fig. XI
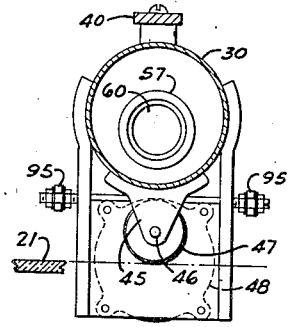
Fig. XII
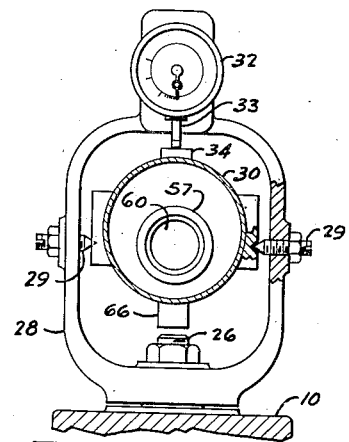
Fig. XIII
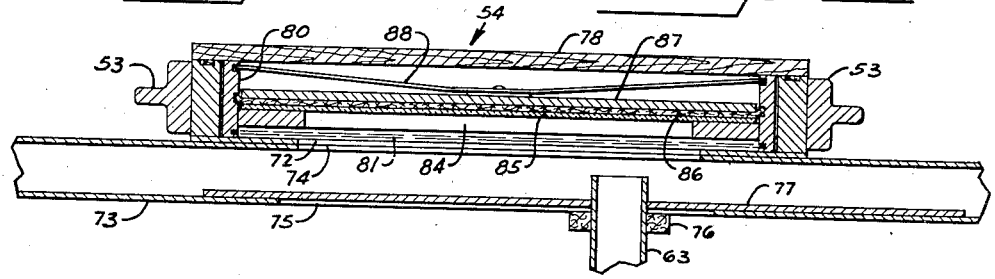
Fig. X
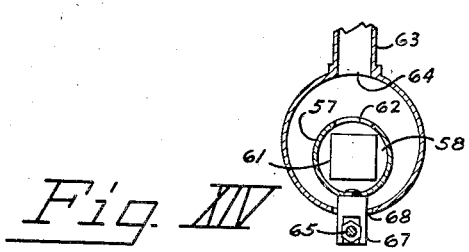
Fig. XIV
Lawrence S. Williams
INVENTOR
Marshall and Marshall
ATTORNEYS Patented Dec. 17, 1946

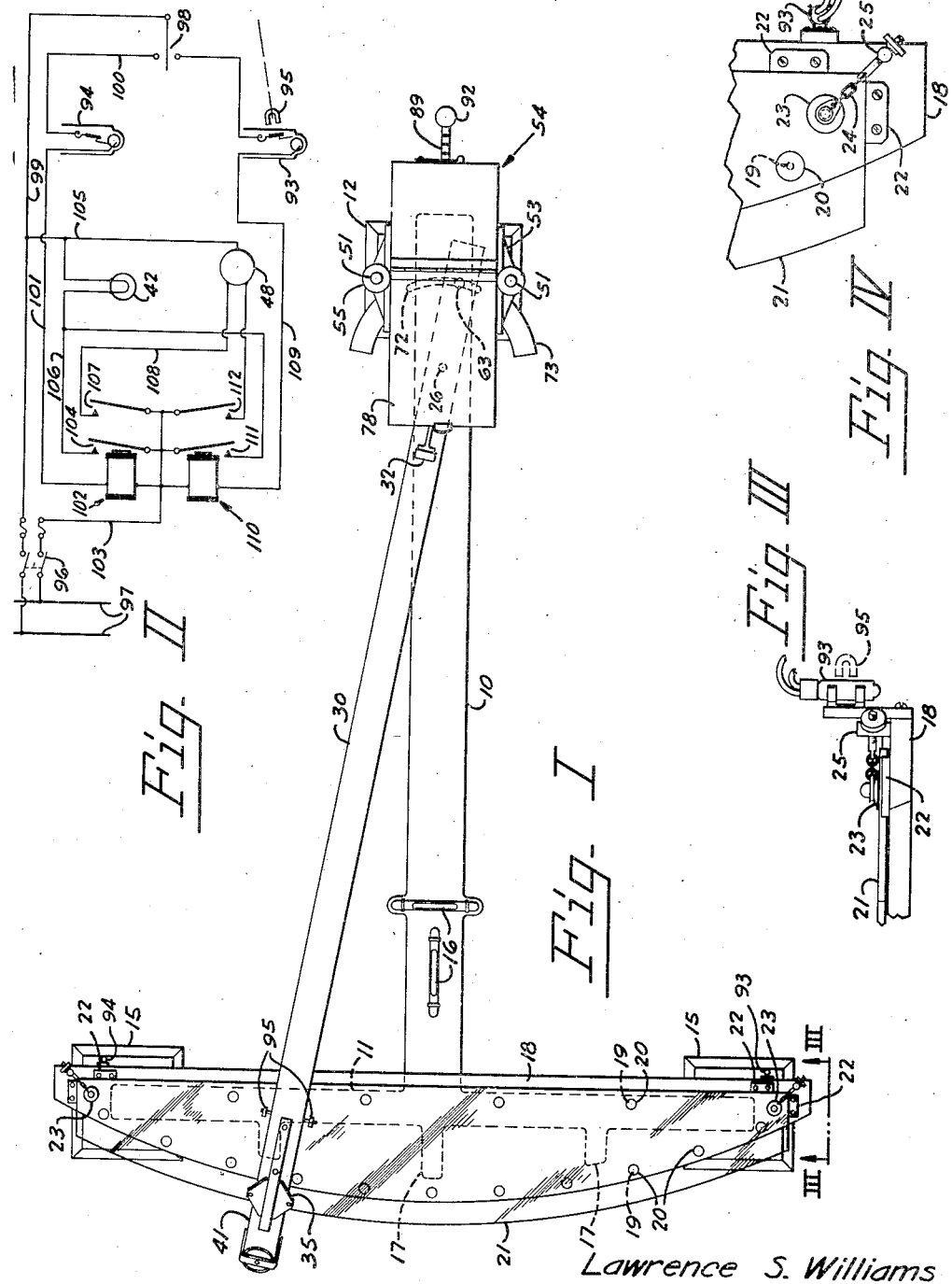

2,412,761

UNITED STATES PATENT OFFICE 2,412,761

REDUCTION CAMERA

Lawrence S. Williams, Toledo, Ohio, assignor to Toledo Scale Company, Toledo, Ohio, a corporation of New Jersey Application April 3, 1942, Serial No. 437,502

4 Claims. (Cl. 88—24)

This invention relates to reduction cameras, and more particularly to a reduction camera for producing arcuate indicia-bearing transparent charts for measuring instruments.

In the manufacture of various types of measuring instruments, in particular instruments of high sensitivity, one of the problems encountered has been the provision of indicating means which will not create errors in the indication of the instruments due to friction or mass in the indicating means itself. Where movable indicators and stationary charts, or movable charts and stationary indicators, are employed, the movable member of the indicating means must be kept extremely light in weight so that its momentum and inertia will not destroy the very accuracy of the instrument. However, in order to make the indicating means light enough to comply with this requirement, it must be relatively small and therefore the number of indicia which can be carried or indicated thereby must also be small since there is a minimum in the size of indicia which can be read.

To overcome these two difficulties, projecting measuring instruments have been developed. This type of measuring instrument employs a transparent chart which bears minute indicia and which is extremely small and light in weight. These minute indicia are magnified to legible size through the medium of the projection equipment. Due to the extremely small size of the indicia on such charts, their preparation is very difficult.

It is an object of this invention to provide a reduction camera for photographically preparing transparent indicia-bearing charts.

It is another object of this invention to provide a reduction camera in which the reduction in size is both mechanically and optically controlled.

It is another object of this invention to provide a reduction camera in which all portions of the object which is to be photographically reduced are exposed the same length of time and with the same light intensity.

It is a further object of this invention to provide a reduction camera for the preparation of small arcuate transparent charts bearing a large number of minute indicia of equal opacity and definition.

More specific objects and advantages are apparent from the description, in which reference is had to the accompanying drawings illustrating a preferred embodiment of the invention.

In the drawings:

Fig. I is a plan view of a reduction camera embodying the invention.

Fig. II is a schematic wiring diagram of the electrical circuit employed in the device illustrated in Fig. I.

Fig. III is a fragmentary enlarged view in elevation, taken substantially from the position indicated by the line III—III of Fig. I.

Fig. IV is a fragmentary enlarged view of a portion of the mechanism illustrated in Fig. I.

Fig. V is a fragmentary view in elevation of the mechanism illustrated in Fig. I.

Fig. VI is a fragmentary greatly enlarged view of the left end of the mechanism shown in Fig. V, certain parts being shown in section and certain parts being broken away.

Fig. VII is a vertical sectional view, taken substantially on the line VII—VII of Fig. VI.

Fig. VIII is a fragmentary view, greatly enlarged, of the right end of the mechanism shown in Fig. V, certain parts being shown in section and certain parts being broken away.

Fig. IX is a fragmentary plan view, taken from the top of Fig. VIII, certain parts being broken away to more thoroughly show their construction.

Fig. X is an enlarged fragmentary vertical sectional view, taken substantially on the line X—X of Fig. IX.

Fig. XI is an end view in elevation, taken from the right side of Fig. VIII.

Fig. XII is a vertical sectional view, taken substantially on the line XII—XII of Fig. VI.

Fig. XIII is a vertical sectional view, taken substantially on the line XIII—XIII of Fig. VIII.

Fig. XIV is a vertical sectional view, taken substantially on the line XIV—XIV of Fig. VIII.

These specific drawings and the specific description that follows merely disclose and illustrate the invention and are not intended to impose limitations upon the claims.

The main frame of the camera consists of a beam 10 and a cross beam 11 which are bolted together to form a substantially T shaped frame structure. One end of the beam 10 is supported on a pier 12 by means of an adjustable foot 13 (Fig. V). Similar feet 14 support each end of the cross frame 11 on similar piers 15. The feet 13 and 14 may be individually adjusted to level the T shaped framework composed of the beams 10 and 11. Level condition of the frame in two directions is indicated by spirit levels 16 which are secured on the upper surface of the main beam 10.

The cross beam 11 has integral ribs 17 which support a segmentally-shaped horizontally extending plate 18. A series of adjustable cone-pointed screws 19 (see also Fig. I) are threaded through the plate 18 near its periphery and also along its chord. In the upper surface of the plate 18, above each of the screws 19, there is a circular socket in which there is fitted a disk 20. The disks 20 rest on the upper ends of the adjustable screws 19. A segmentally-shaped transparent plate 21 rests on the adjustable disks 20 and overhangs the curved edge of the plate 18 by a substantial distance (Fig. VI). The plate 21 is preferably of fairly heavy plate glass. The plate 21 is held against horizontal movement by means of a pair of stops 22 (Figs. I, III and IV) which are secured to a portion of the plate 18 extending outside the ends and chord of the transparent plate 21. The plate 21 is held against the stops 22 by suction cups 23 which are pressed on the surface of the plate 21 and linked by means of chains 24 to posts 25 secured to the plate 18.

Near the opposite end of the main frame member 10, an axle 26 (see also Fig. VIII) is journaled in a vertical bore extending through the web of the frame member 10 by means of ball bearings 27 which serve both to rotatably mount the axle 26 and to support the weight of apparatus carried thereby. A yoke 28 is bolted to the upper end of the axle 26 (see also Fig. XIII). The yoke 28 has a pointed screw 29 adjustably threaded through each of its side arms, which two screws form a horizontal axis for a hollow main camera tube 30 of the camera. At the upper end of the yoke 28 there is bolted a horizontally extending arm 31 (Figs. V and VIII) on the end of which there is secured a dial indicator 32 from which an actuating plunger 33 extends downwardly to engage a pad 34 secured to the upper exterior surface of the camera tube 30.

The camera tube 30 is pivoted for movement in a horizontal plane on the axle 26 and the greater proportion of its length extends from the axle 26 toward the cross frame 11 and plate 18 supported thereby. The curvature of the edges of the plate 18 and transparent plate 21 is substantially that of an arc of a circle drawn with the axle 26 as its center point. The left-hand (Fig. V), or front end of the camera tube 30 is closed by a beveled cap 35 (Figs. V and VI) on the inner surface of which there is secured a mirror 36 (see also Fig. VII). The mirror 36 is placed at a vertical angle of 45° to the longitudinal center line of the camera tube 30. A hood 37 extends downwardly from a rectangular opening 38 in the lower wall of the camera tube 30 and the hood 37 has a similar rectangular opening 39 in its lower end which is immediately above the upper surface of the transparent plate 21. The hood 37 and its opening are so located that two vertical planes constructed to intersect at the crossing of the center lines of the rectangular openings 38 and 39 would also intersect at the point on the mirror 36 where the longitudinal center line of the tube 30 would strike the surface of the mirror 36.

A bracket 40 is secured to the upper surface of the camera tube 30 and extends over its end where it supports a light fixture 41 containing a lamp 42 and a mirror 43 so located as to reflect light from the lamp upwardly through an opening 44 in the wall of the fixture 41, through the glass plate 21 and into the rectangular openings 39 and 38 onto the mirror 36 from whence it is reflected through the camera tube 30.

A pair of brackets 45 (see also Fig. XII) are mounted on the undersurface of the camera tube 30, and in these brackets 45 there is journaled a horizontal shaft 46 the axis of which is parallel to the center line of the camera tube 30. A drive wheel 47 is pinned to the shaft 46 and runs on the upper surface of the glass plate 21. A reversible synchronous electric motor 48 is supported beneath the camera tube 30 and a drive shaft 49 connects the shaft of the motor 48 to the shaft 46.

At the end of the main frame member 10, opposite from the cross frame member 11, there are bolted two side arms 50 (Figs. VIII and XI) in each of which there is secured a vertically extending rod 51. A nut 52 is threaded on to each of the rods 51 and supports one of a pair of sleeves 53 which are a portion of the framework supporting a plate-holding box 54. A nut 55 is threaded on each of the rods 51 above the sleeves 53 to hold the framework in place on the rods 51.

In the interior of the camera tube 30, approximately between the rods 51, there is located a collar 56 (Fig. VIII) which supports the front end of a lens tube 57 located below center within the camera tube 30. The rear end of the lens tube 57 surrounds a cylindrical plug 58 which extends out through a hole in an end plug 59 of the camera tube 30. The hole in the end plug 59, through which the cylindrical plug extends, is concentric with the hole in the collar 56 through which the tube 57 extends. An objective lens 60 is mounted in the forward end of the lens tube 57 and a right angle prism 61 (see also Fig. XIV) is attached to the forward diagonally cut face of the cylindrical plug 58. The prism 61 is so centered in the lens tube 57 that the axis of the lens 60 is at right angles to its forward face and centered thereon. A circular opening 62 in the lens tube 57 is located immediately above the prism 61 and concentric with a vertically extending tube 63 which is fixed to the upper wall of the camera tube 30 around a hole 64 in this upper wall.

The focal axes of the lens 60 and prism 61 are below the central axis of the camera tube 30 for the following reason: The master chart which is produced on the plate 21 is usually composed of indicia lines and numerals. The indicia lines are located nearer the curved edge of the plate 21 so that they can be spread farther apart. When the image of these indicia is reflected from the mirror 36, the light rays carrying the image of the indicia lines are below the axis of the tube 30. Light rays which pass through a lens on its focal axis are distorted far less than rays which pass through the lens at other points and, since the rays carrying images of the indicia lines and numerals cannot both pass through the lens on its focal axis, it is better to have the indicia lines be as undistorted as possible because the indication of the finished scale depends on the indicia lines—the numerals only giving a value for the indicia line adjacent which the indicator is located.

Light which has been reflected through the length of the camera tube 30 by the mirror 36, located at its other end, is focused by the lens 60 and refracted 90° by the prism 61 upwardly through the tube 63. The lens tube 57 may be adjusted longitudinally of the camera tube 30 by means of an adjusting screw 65 which is threaded into a block 66 attached to the undersurface of the tube 30 and through a pin 67 (Fig. XIV) which is riveted to the undersurface of the lens tube 57 and extends downwardly through a slot 68 in the camera tube 30. Rotative adjustment of the prism 61, to vary the transverse vertical angle (with respect to the camera tube 30) at which the light emanates from the prism 61, is accomplished by means of an arm 69 (see also Fig. XI) which is attached to the outermost end of the cylindrical plug 58 and which has a pair of oppositely directed adjusting screws 70 threaded into it. The screws 70 bear on a rearwardly extending screw 71 which is threaded into the end plug 59 of the camera tube 30. Adjustment of the screws 70 swivels the cylindrical plug 58 on its longitudinal axis. Adjustment of the screw 71 slides the cylindrical plug 58 longitudinally to line up the prism 61 with the center line of the tube 63. Thus the angle at which the light emanates from the prism 61 is adjustable in two vertical planes at right angles to each other, which planes should intersect on the center line of the tube 63.

The plate-holding box 54 (see also Fig. X) has an arcuate opening 72 in its bottom which is located above and along the path of travel of the vertically extending tube 63. An arcuate hollow light trap 73 is located beneath the plate-holding box 54 and has an arcuate opening 74 in its top which is in registration with the opening 72 in the bottom of the plate-holding box 54. The light trap 73 forms an arc of the same center radius as the openings 72 and 74 but slightly more than three times as long. The vertical tube 63 extends upwardly into the light trap 73 through a larger arcuate opening 75 in the bottom of the light trap 73 which is located beneath the openings 72 and 74. A cushioning washer 76 (made of felt or other similar material) is secured around the tube 63 and is substantially wider than the slot 75, the width of which is just greater than the outside diameter of the tube 63. An arcuately-shaped sliding member 77 of the same width as the interior of the light trap 73 has a hole substantially at its center through which the upper end of the tube 63 projects. The sliding member 77 is approximately two-thirds as long as the light trap 73 and about twice as long as the arcuate openings 72, 74 and 75. As the tube 63 is swung through a horizontal arcuate path, by the movement of the camera tube 30 on its axle 26, the sliding member 77 always covers the opening 75 in the bottom of the light trap 73 and prevents any light from entering the light trap or the plate-holding box 54.

The plate-holding box 54 has a hinged top 78 which is held in place by a spring clamp 79 and which can be opened to insert or withdraw a plate holder 80. The plate holder 80 is substantially the same as plate holders employed in ordinary cameras with the following exceptions: A sliding shutter 81 of the plate holder is not provided with a withdrawing handle, as is customary in plate holders, but instead has holes 82 (Figs. VIII and IX) which are adapted to be engaged by pins 83 extending upwardly from the bottom of the plate-holding box 54. When the plate holder 80 is placed in the plate-holding box, the pins 83 are engaged with the holes 82 in the shutter 81. In addition there are cut in the bottom of the plate holder 80 a series of arcuate openings 84 which are constructed on the same radius and are of substantially the same size as the openings 72 and 74 in the bottom and top of the plate-holding box 54 and the light trap 73 respectively. A plate 85 rests on the arcuately slotted bottom of the plate holder 80. A pad 86 is placed between the plate 85 and sectioned plate holders 87 which are held in place by clamps 88 engaged in rabbets in the walls of the plate holder 80.

A notched rod 89 extends into the plate-holding box 54 through an opening in its end wall opposite the closing clamp 79 and when the plate holder 80 is placed in the plate-holding box 54 the end of this rod 89 is engaged in a slotted bracket 90 screwed on the end of the plate holder 80. A movable latch 91 is attached to the outside of the end wall of the plate-holding box 54 and is adapted to be engaged successively in the notches in the rod 89. A knob 92 is screwed onto the outermost end of the rod 89.

*Operation.*

Before operating the camera, it must be made substantially level. The frame feet 13 and 14 are adjusted until the frame, as indicated by the spirit levels 16, is horizontal. The camera tube 30 is then moved over its path of travel slowly and any out of level or uneven condition of the glass plate 21 is shown by variations in the reading of the dial indicator 32. These conditions may be corrected by raising or lowering the plate supporting disks 20 by means of the screws 19. When the camera tube can be moved from one side of the plate to the other without any appreciable movement of the indicator 32, the plate 21 can be assumed to be level and to have all its uneven portions compensated for.

The operation of the camera is semiautomatic in nature and is controlled by two magnetic mercury switches 93 and 94 (Figs. II, III and IV). These switches are mounted on the edge of the plate 18 near its ends and are adjacent the path of movement of two small permanent magnets 95 (see also Figs. VI and XII) which are attached, one on each side, beneath the camera tube 30.

In using the camera for the production of arcuate transparent indicia-bearing charts, a master chart, which is to be photographically reduced, is formed on the surface of the transparent plate 21 along the curved edge thereof and beneath the arcuate path of movement of the openings in the hood 37 near the front end of the camera tube 30. This master chart may be formed with paint or ink, or other printing material, which can be stenciled, sprayed or otherwise placed on the upper surface of the glass plate 21. It should be borne in mind however that the accuracy of the final photographically reduced chart depends not only on the accuracy of operation of the camera but also on the accuracy and care with which the large size master chart is prepared.

The camera tube is placed at one end of its path of movement, a new plate inserted in the plate holder and that, in turn, placed in the plate-holding box. The plate holder 80 is moved along in the plate-holding box 54 to the position shown in Figs. VIII and IX which withdraws the shutter 81 from beneath the first of the arcuate slots 84 in the bottom of the plate holder 80.

A main switch 96 (Fig. II) is closed and current enters the circuit from a power line 97. A reversing switch 98 is closed to one of its two contacts to produce forward rotation of the motor 48 and forward movement of the camera tube. Current then flows, for example, from the line, through the main switch 96, a lead 99, the reversing switch 98, a lead 100, the magnetic mercury switch 94 (that switch located at the far end of the plate 18 from the starting position of the camera tube), a lead 101, the coil of a relay 102 and a lead 103 to the opposite side of the line. This energizes the relay 102 and closes its normally open contact 104. Current then flows from the lead 99, through a lead 105, the lamp 42, a lead 106, the contact 104 and the lead 103 to the opposite side of the line. At the same time a contact 107 of the relay 102 has closed and current also flows from the lead 99, through the lead 105, the forward direction coils of the motor 48, a lead 108, the contact 107 and the lead 103 to the opposite side of the line. Energization of the motor 48 rotates the driving wheel 47 and starts to move the camera tube from that side of the machine at which it is located toward the opposite side of the machine.

Light from the lamp 42 is reflected by the mirror 43 upwardly through the glass plate 21 against the diagonal mirror 36 which reflects it down the camera tube 30 where it is focused by the lens 60 and refracted by the prism 61 upward through the tube 23 and arcuate slots in the plate-holding box and plate holder onto the sensitized surface of the plate. As the camera tube travels across the machine, the vertical tube 63 swings through an arc directly proportional to that arc through which the front end of the camera tube is swung. The mechanical reduction in distance and speed of movement is equal to the photographic reduction in size of the indicia being photographed. The motor 48 is synchronous and the successive indicia therefore are illuminated and exposed for the same period of time. The sensitized plate receives light carrying the image of successive indicia and is progressively exposed along the length of the arcuate slot in the bottom of the plate holder.

As soon as the camera tube 30 leaves the position from which it started, the magnet 95 moves away from the magnetic mercury switch 93 and this switch is permitted to close. When the camera tube reaches the far end of the plate 21, the magnet 95 on the far side of the tube is moved in front of the magnetic mercury switch 94. The attraction between the magnet and the armature of the switch opens the switch and, through a reversal of the steps already described, de-energizes the relay 102 which permits the contacts 104 and 107 to open, de-energizing the lamp 42 and motor 48 and bringing the movement of the camera tube 30 to an end.

The knob 92 (Fig. VIII) is used to move the plate holder 80 farther into the plate-holding box and the latch 91 snapped into the successive one of the notches in the rod 89 to position the plate holder with the second one of the arcuate slots 84 located in light receiving position. The reversing switch 98 is then moved to close its other contact and current flows from the lead 99, through the switch 98, and now closed magnetic mercury switch 93, a lead 109, the coil of a relay 110 and the lead 103 to the opposite side of the line. Energization of the coil of the relay 110 closes normally open contacts 111 and 112 of this relay which in turn close a circuit to illuminate the lamp 42 and energize the reverse direction coils of the motor 48. The camera tube is thus moved back across the surface of the glass plate 21 and a second exposure made of the indicia printed thereon to produce a second reduced size image of these indicia on the sensitized surface of the plate.

Successive exposures are similarly made of the indicia on the surface of the glass plate 21 until a number of photographs of these indicia have been made; one through each of the several arcuate slots in the plate holder. The plate is then developed and the negatives so produced may be repeatedly used by means of contact, or other printing means, to produce positive photographic reproductions of the master for use as transparent indicia-bearing charts in projecting measuring instruments.

The embodiment of the invention that has been disclosed may be modified to meet various requirements.

Having described my invention, I claim:

1. A reduction camera for preparing transparent arcuate indicia bearing charts comprising, in combination, a horizontally disposed angularly movable tube, a vertical axle member for said tube located near one of its ends, said tube also being mounted for slight vertical angular movement, optical equipment in said tube, a photographic plate mounted near that end of said tube nearer said axle, an objective plate mounted adjacent the path of movement of that end of said tube farther from said axle, said optical equipment being arranged to photograph said objective plate on said photographic plate, said objective plate being arcuate in shape and adapted to bear master indicia for charts being prepared, leveling means for said objective plate, said leveling means comprising a plurality of vertically adjustable supports extending along and near the arcuate edge of said objective plate, means for imparting horizontal angular movement to said tube including a tube supporting wheel engaged with the upper surface of said objective plate, and an indicating gauge mounted on said vertical axle member and operatively connected to said tube to indicate vertical angular movement of said tube caused by said supporting wheel engaging uneven surfaces on said objective plate, said leveling means being adjustable to level said plate.

2. In a device of the class described, in combination, a horizontally disposed camera tube pivotally mounted near one of its ends for wide horizontal angular movement and relatively slight vertical angular movement, an arcuate transparent plate mounted parallel to the horizontal path of movement of said tube at that end of said tube farther removed from the pivotal mounting thereof, said plate being adapted to have master indicia reproduced on its surface along its edge, a photographic plate holder located at the other end of said tube, optical means in said tube for projecting an image of such master indicia onto said photographic plate, a reversible electric motor for swinging said tube through horizontal angular movement, a support wheel for said tube running on the upper surface of said arcuate transparent plate, and electrical means for controlling the operation of said reversible motor.

3. In a device of the class described, in combination, a horizontally disposed camera tube pivotally mounted near one of its ends for wide horizontal angular movement and relatively slight vertical angular movement, an arcuate transparent plate mounted parallel to the horizontal path of movement of said tube at that end of said tube farther removed from the pivotal mounting thereof, said plate being adapted to have master indicia reproduced on its surface along its edge, a photographic plate holder located at the other end of said tube, optical means in said tube for projecting an image of such master indicia onto said photographic plate, a reversible electric motor for swinging said tube through horizontal angular movement, a support wheel for said tube running on the upper surface of said arcuate transparent plate, and electrical means for controlling the operation of said reversible motor, said electrical means including manually operable starting means, switches operated by said tube upon reaching its limit of travel in either direction and automatic reset means for conditioning said electrical means for alternately driving said tube forward and backward upon successive energizations of said motor by said manually operable starting means.

4. In a reduction camera, in combination, a camera tube pivotally mounted nearer one of its ends for angular movement on a plane lying along its axis, an objective mounting frame lying along the path of movement of that end of said tube farther removed from the pivotal mounting of said tube, optical equipment in said tube, the optical ratio of said equipment being equal to the ratio between the movement of the ends of said tube and a photographic plate holder located adjacent the path of movement of that end of said tube nearer the pivotal mounting thereof, said photographic plate holder having an arcuate opening parallel to the surface of the photographic plate held therein for defining the area of said plate progressively exposed by movement of said tube on its mounting, said plate being adjustably positionable relative to said opening for making successive exposures on said plate.

LAWRENCE S. WILLIAMS.